US009398500B2

(12) United States Patent
Yiu et al.

(10) Patent No.: US 9,398,500 B2
(45) Date of Patent: Jul. 19, 2016

(54) SYSTEMS, METHODS, AND DEVICES FOR CELL SELECTION BASED ON PRIORITIZED NODES

(71) Applicants: Candy Yiu, Beaverton, OR (US); Ana Lucia A. Pinheiro, Breinigsville, PA (US); Hyung-Nam Choi, Hamburg (DE); Sangeetha L. Bangolae, Beaverton, OR (US); Marta Martinez Tarradell, Hillsboro, OR (US); Umesh Phuyal, Beaverton, OR (US); Puneet K. Jain, Hillsboro, OR (US)

(72) Inventors: Candy Yiu, Beaverton, OR (US); Ana Lucia A. Pinheiro, Breinigsville, PA (US); Hyung-Nam Choi, Hamburg (DE); Sangeetha L. Bangolae, Beaverton, OR (US); Marta Martinez Tarradell, Hillsboro, OR (US); Umesh Phuyal, Beaverton, OR (US); Puneet K. Jain, Hillsboro, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/580,779

(22) Filed: Dec. 23, 2014

(65) Prior Publication Data

US 2015/0327133 A1 Nov. 12, 2015

Related U.S. Application Data

(60) Provisional application No. 61/990,650, filed on May 8, 2014.

(51) Int. Cl.
*H04W 36/00* (2009.01)
*H04W 36/24* (2009.01)
*H04W 36/08* (2009.01)

(52) U.S. Cl.
CPC .......... *H04W 36/0083* (2013.01); *H04W 36/08* (2013.01); *H04W 36/24* (2013.01)

(58) Field of Classification Search
CPC ...... H04W 36/30; H04W 36/18; H04W 36/08
USPC ................... 455/436, 442, 432.1, 422.1, 423; 370/331
See application file for complete search history.

(56) References Cited

U.S. PATENT DOCUMENTS

| 2009/0168727 A1 | 7/2009 | Somasundaram et al. |
| 2010/0222055 A1 | 9/2010 | Cho et al. |

(Continued)

FOREIGN PATENT DOCUMENTS

WO 2013020649 A1 2/2013

OTHER PUBLICATIONS

3GPP TS 36.304, Technical Specification Group Radio Access Network; Evolved Universal Terrestrial Radio Access (E-UTRA); User Equipment (UE) procedures in idle mode (Release 12) V12.0.0, Mar. 2014, 34 pages.

(Continued)

*Primary Examiner* — Nghi H Ly
(74) *Attorney, Agent, or Firm* — Stoel Rives LLP

(57) ABSTRACT

Systems and methods for cell selection and/or reselection based on prioritize nodes are disclosed herein. User equipment (UE) may be configured to determine whether to select and/or reselect an Evolved Universal Terrestrial Radio Access Network (E-UTRAN) Node B (eNB). The eNB may be a dedicated eNB and/or may be communicatively coupled to a dedicated core network (CN). The dedicated eNB and/or the dedicated CN may be configured to optimize performance for UEs sharing particular characteristics. Accordingly, the selection and/or reselection criteria may be biased to encourage the UE to select and/or reselect towards a dedicated eNB and/or an eNB coupled to a dedicated CN. The eNB and/or CN may be dedicated to supporting particular types of UEs, types of nodes, types of traffic, types of subscriptions, UE mobilities, applications/services, other predetermined categories, and/or the like.

7 Claims, 7 Drawing Sheets

(56) References Cited

U.S. PATENT DOCUMENTS

| | | | |
|---|---|---|---|
| 2011/0116395 A1* | 5/2011 | Tsuda | H04W 28/18 370/252 |
| 2012/0322446 A1 | 12/2012 | Ramachandran et al. | |
| 2013/0136078 A1* | 5/2013 | Bucknell | H04W 28/06 370/329 |

OTHER PUBLICATIONS

NTT DoCoMo, Vodafone, "New WID on Dedicated Core Networks", S2-141501, 3GPP TSG|WG-2 Meeting #102, St. Julien's, Malta, Mar. 24-28, 2013, 5 pages.

PCT/US2015/025189, International Search Report and Written Opinion, Jul. 13, 2015, 11 pages.

\* cited by examiner

SYSTEMS, METHODS, AND DEVICES FOR CELL SELECTION BASED ON PRIORITIZED NODES

RELATED APPLICATIONS

This application claims priority to and the benefit of U.S. Provisional Patent Application No. 61/990,650, filed May 8, 2014, which is hereby incorporated by reference herein in its entirety.

TECHNICAL FIELD

The present disclosure relates to systems, methods, and devices for selecting cells based on prioritized nodes.

DETAILED DESCRIPTION OF PREFERRED EMBODIMENTS

Figure 1:
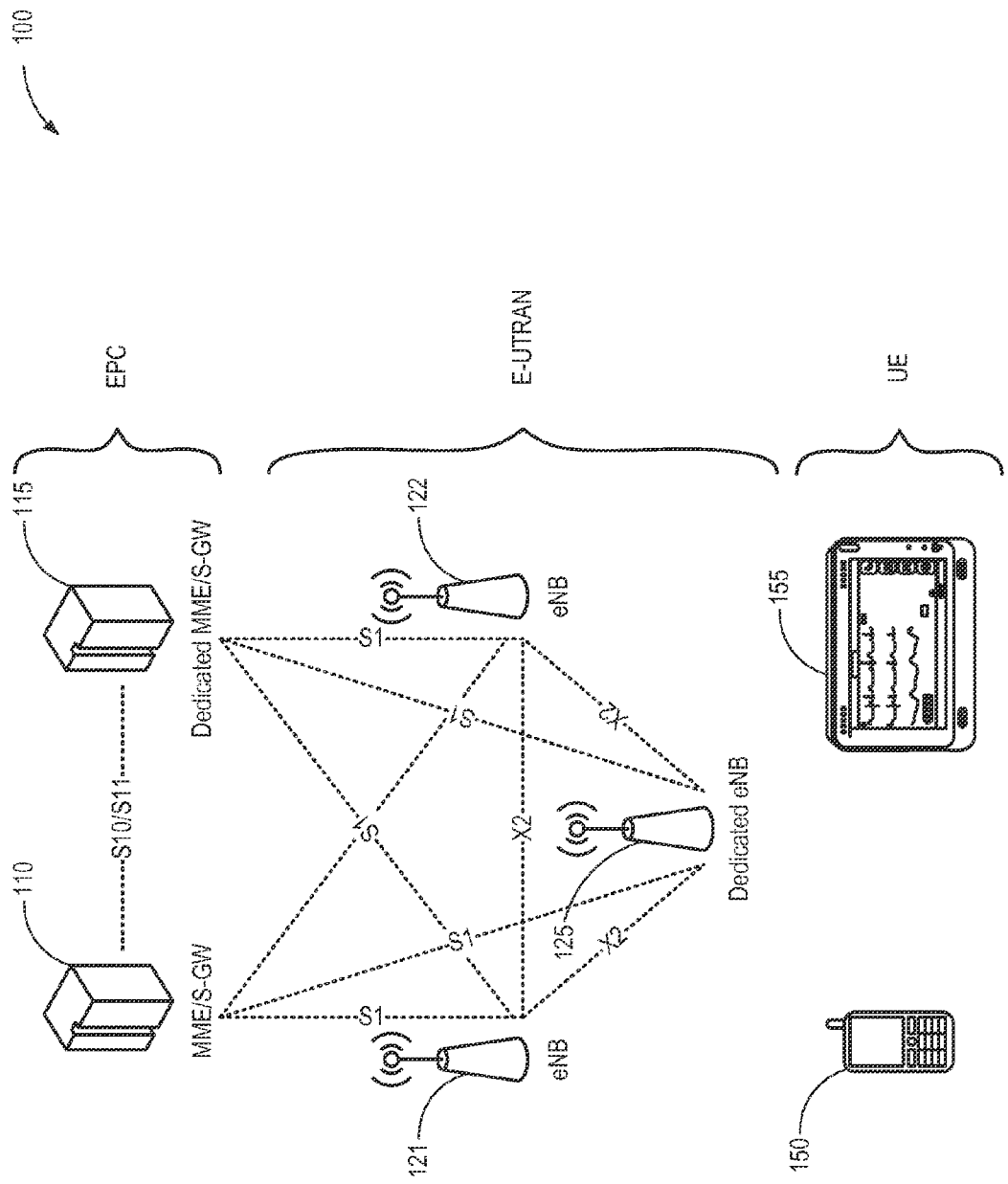
FIG. 1 is a schematic diagram of a system comprising a plurality of MMEs/SGWs and eNBs.

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wireless Local Area Network (WLAN) or Wi-Fi. In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNodeBs and may communicate with a plurality of UEs. An evolved packet core (EPC) may communicatively couple the E-UTRAN to an external network, such as the Internet. LTE networks include radio access technology (RAT) and core radio network architecture that can provide high data rate, low latency, packet optimization, and improved system capacity and coverage.

A wireless communication network may include one or more dedicated network nodes. For example, a RAN and/or an EPC may be a dedicated RAN and/or a dedicated EPC. A dedicated node may be dedicated to UEs sharing identical characteristics. The dedicated node may be optimized for the UEs thus may more efficiently handle the UEs and/or associated traffic. Software-defined networking and network functions virtualization may allow for fast and affordable deployment of dedicated nodes (e.g., a mobility management entity (MME) may be instantiated as a virtual network function). In some embodiments, the dedicated node may support machine-type communication (MTC), low complexity/category 0 UEs, and/or Internet of Things (IoT) UEs (e.g., small data, health, security, etc. UEs). A dedicated node may provide support for always-on connectivity, small data, frequent data transfer, high priority access, healthcare, video surveillance networks, etc. Alternatively, or in addition, a dedicated node may provide support for specific services/applications that the UE is running.

A UE may measure a signal from an eNB to determine whether to select the eNB and camp on it and/or to reselect to that eNB from another eNB. For example, the UE may measure the signal from an eNB by measuring a Reference Signal Received Power (RSRP), a Reference Signal Received Quality (RSRQ), and/or the like. If the measured signal satisfies predetermined criteria, the UE may select and/or reselect the corresponding eNB. Selection and/or reselection criteria may be adjusted based on UE characteristics and whether an eNB supports a corresponding dedicated node. An eNB may support a corresponding dedicated node if the eNB is a dedicated eNB; if the eNB is communicatively coupled to a dedicated MME, serving gateway (SGW), packet data network gateway (PGW), etc.; and/or the like. Selection and/or reselection criteria may be adjusted based on whether a node is optimized to serve a specific application, application category, quality of service class identifier (QCI), etc. with which the UE is configured. The adjusted criteria may provide improved offloading and avoid ping pong in cell selections/reselections by the UE.

Cell selection may give priority to eNBs that support dedicated nodes, such as dedicated RANs, dedicated EPCs, and/or both. An offset may be included for eNBs that support a dedicated node. For example, a quality criterion, Squal, may be calculated according to the equation:

$$\text{Squal} = Q_{qualmeas} - (Q_{qualmin} + Q_{qualmin\,offset} + Q_{qualoffsetdedicated}) \quad (1)$$

Where $Q_{qualmeas}$ is a measured cell quality value (e.g., RSRQ), $Q_{qualmin}$ is a minimum required quality in the cell, $Q_{qualminoffset}$ is an offset to the signaled $Q_{qualmin}$ taken into account in the Squal evaluation as a result of a periodic search for a higher priority public land mobile network (PLMN) while camped normally in a visitor PLMN (VPLMN), and $Q_{qualoffsetdedicated}$ is an offset to account for whether the cell supports a dedicated network. Each dedicated network or type of dedicated network may have a different value for $O_{qualoffsetdedicated}$. Values for $Q_{qualoffsetdedicated}$ may be positive or negative depending on the embodiment and/or configuration.

A different offset may be used for dedicated RANs than for dedicated EPCs. For example, the quality criterion, Squal, may be calculated differently based on whether there is a dedicated RAN, a dedicated EPC, or both using the equations:

$$\text{Squal} = Q_{qualmeas} - (Q_{qualmin} + Q_{qualmin\,offset} + Q_{qualoffsetdedicatedRAN}) \quad (2)$$

$$\text{Squal} = Q_{qualmeas} - (Q_{qualmin} + Q_{qualmin\,offset} + Q_{qualoffsetdedicatedEPC}) \quad (3)$$

$$\text{Squal} = Q_{qualmeas} - (Q_{qualmin} + Q_{qualmin\,offset} + Q_{qualoffsetdedicatedRAN} + Q_{qualoffsetdedicatedEPC}) \quad (4)$$

Where $Q_{qualoffsetdedicatedRAN}$ is an offset to take into account the fact that an eNB supports a dedicated RAN and $Q_{qualoffsetdedicatedEPC}$ is an offset to take into account the fact that an eNB supports a dedicated EPC. Each dedicated RAN may have a different offset, and each dedicated EPC may have a different offset.

Similarly, a power level criterion may be calculated using an offset to account for whether an eNB supports a dedicated node. For example, a quality criterion, Srxlev, may be calculated according to the equation:

$$Srxlev = Q_{rxlevmeas} - (Q_{rxlevmin} + Q_{rxlevmin\ offset}) - P_{compensation} + Q_{rxlevoffsetdedicated} \quad (5)$$

Where $Q_{rxlevmeas}$ is a measured cell RX level value (e.g., RSRP), $Q_{rxlevmin}$ is a minimum required RX level in the cell, $Q_{rxlevminoffset}$ is an offset to the signaled $Q_{rxlevmin}$ taken into account in the Srxlev evaluation as a result of a periodic search for a higher priority PLMN while camped normally in a VPLMN, $P_{compensation}$ is a maximum function of zero and the difference between the maximum UE power to be used in this cell and the maximum UE power according to the UE's power class, and $Q_{rxlevoffsetdedicated}$ is an offset to account for whether the cell supports a dedicated network. Each dedicated network or type of dedicated network may have a different value for $Q_{rxlevoffsetdedicated}$. Values for $Q_{rxlevoffsetdedicated}$ may be positive or negative depending on the embodiment and/or configuration.

A different offset may be used for dedicated RANs than for dedicated EPCs. For example, the quality criterion, Srxlev, may be calculated differently based on whether there is a dedicated RAN, a dedicated EPC, or both using the equations:

$$Srxlev = Q_{rxlevmeas} - (Q_{rxlevmin} + Q_{rxlevmin\ offset}) - P_{compensation} + Q_{rxlevoffsetdedicatedRAN} \quad (6)$$

$$Srxlev = Q_{rxlevmeas} - (Q_{rxlevmin} + Q_{rxlevmin\ offset}) - P_{compensation} + Q_{rxlevoffsetdedicatedEPC} \quad (7)$$

$$Srxlev = Q_{rxlevmeas} - (Q_{rxlevmin} + Q_{rxlevmin\ offset}) - P_{compensation} + Q_{rxlevoffsetdedicatedRAN} + Q_{rxlevoffsetdedicatedEPC} \quad (8)$$

Where $Q_{rxlevoffsetdedicatedRAN}$ is an offset to take into account the fact that an eNB supports a dedicated RAN and $Q_{rxlevoffsetdedicatedEPC}$ is an offset to take into account the fact that an eNB supports a dedicated EPC. Each dedicated RAN may have a different offset, and each dedicated EPC may have a different offset. Different types of nodes (e.g., MTC nodes, IoT nodes, etc.) may have different offsets applied for calculation of a selection criterion (e.g., Squal, Srxlev, etc.).

An offset for cell selection may also or instead be applied for different applications/services supported and/or prioritized by a node. The applications/services may include interactive (e.g., gaming), video (e.g., caching capability), and/or the like. A bitmap may be used to indicate the applications/services supported and/or prioritized by a node. Each bit may indicate whether the node supports and/or prioritizes a specific, predetermined application/service corresponding to the bit. A bitmap of desired applications/services of the UE may be compared to the node bitmap (e.g., by performing a bitwise AND) to determine if there is a match and/or how many matches exist. An offset may be determined if a match is found. The bitmap of applications/services provided may be sent with corresponding offset values to be used in calculating a selection criterion. A largest offset, a sum of offsets, and/or the like may be determined for any matches. The cell selection procedure may be applied using the determined offset.

Nodes and/or groups of nodes that share characteristics may be assigned to categories. For example, an MTC cell group that supports MTC traffic, small data traffic, and/or the like may be assigned to a category. The categories may be predefined in a specification, predefined by a network operator, and/or the like. The nodes and/or groups of nodes may indicate to the UE which cells, frequencies, or groups belong to each category. The UE may use a predetermined set of rules to determine which category and/or group to select. The rules may be based on time, location, configuration or broadcast information, service offered, etc. For example, an MTC type UE in idle mode with a small data rate may decide to camp on a dedicated cell belonging to a group. In addition, the UE may become a member of such a group for expedited services and reduced signal overhead handling. Offsets similar to those used in equations 1-8 may be used for determining which cell to select. The UE may be allowed to perform cell reselection to specific cells based on the services that are supported.

Cell reselection may also give priority to eNBs that supported dedicated nodes. In an embodiment, a threshold may be used to determine whether reselect towards a cell that supports a corresponding dedicated node from a cell that does not support a corresponding dedicated node. For example, a threshold, $Thresh_{X,Dedicated}$, may specify an Srxlev threshold for reselecting to an eNB that supports a dedicated node. Each dedicated node may have a different threshold value. Alternatively, or in addition, thresholds, $Thresh_{X,DedicatedRAN}$ and $Thresh_{X,DedicatedEPC}$, may be used as Srxlev thresholds for reselecting to an eNB that supports a dedicated RAN or dedicated EPC respectively. Each dedicated RAN may have a different threshold value, and each dedicated EPC may have a different threshold value.

The UE may be able to communicatively couple with any of a plurality of overlaying networks (e.g., different radio access technologies (RATs), different frequencies, etc.), which can be dedicated per node, per frequency, and/or the like. For example, a first frequency layer may be dedicated for MTC, and a second frequency layer may be dedicated for video. The UE may select the nodes and/or frequency layers dedicated to that type of UE and/or dedicated to a desired application/service. When it is in idle mode, the UE may reselect to the node and/or frequency layer most optimized for the UE. A threshold, $Thresh_{X,DedicatedFreq}$, as an Srxlev threshold may be used when reselecting towards a cell that supports a dedicated frequency from a cell that does not. Each dedicated frequency may have a different threshold value.

For intra-frequency and equal priority inter-frequency cell reselection, reselection criteria may be calculated with an offset for dedicated nodes. For example, the reselection criteria may be computed according to the equations:

$$R_s = Q_{meas,s} + Q_{Hyst} \quad (9)$$

$$R_n = Q_{meas,n} - Q_{offset} \quad (10)$$

Where $R_s$ is a reselection criterion for a serving cell, $R_n$ is a reselection criterion for a neighboring cell, $Q_{meas,s}$ and $Q_{meas,n}$ are RSRP measurement quantities used in cell reselections from the serving cell and neighboring cell respectively, and $Q_{Hyst}$ is a hysteresis value. And where Qoffset, for intra-frequency, equals $Qoffset_{s,n}$ (a predetermined offset between the serving cell and the neighboring cell provided by the eNB), if $Qoffset_{s,n}$ is valid and otherwise equals zero, and Qoffset for inter-frequency measurements, equals $Qoffset_{s,n}$ plus $Qoffset_{frequency}$ (a frequency-specific offset for equal priority E-UTRAN frequencies) plus $Qoffset_{dedicated}$ (an offset to account for whether the cell supports a dedicated network) if $Qoffset_{s,n}$ and $Qoffset_{dedicated}$ are valid, otherwise equals $Qoffset_{s,n}$ plus $Qoffset_{frequency}$ if $Qoffset_{s,n}$ is valid, and otherwise equals $Qoffset_{frequency}$. In alternate embodiments, the dedicated offset may be not included in Qoffset but rather may be included as a separate element of equation 10.

The UE may perform ranking of all cells that fulfill the updated cell selection criterion S>0 (e.g., using a cell selection criterion from one or more of equations 1-8). The cells may be ranked according to the reselection criteria (e.g., $R_s$ and $R_n$ according to equations 9 and 10). The UE may perform the measurements to acquire $Q_{meas,n}$ and $Q_{meas,s}$ and calculate the reselection criteria using averaged RSRP results. The UE may perform cell reselection to the cell ranked as the best cell.

Nodes may be prioritized for selection and/or reselection based on an application/service, a node type, a traffic type, a subscription, UE mobility, and/or the like. The prioritized nodes may include specific characteristics that support the particular configuration being prioritized. For example, the prioritized nodes may include dynamic on/off, beam shaping, etc. In some embodiments, a combination of application or node type and UE mobility may provide a good parameter for deciding the cell to which the UE should select/reselect. For example, a high mobility and small data traffic type UE may select/reselect to a cell that supports small data optimization/enhancement but does not change other parameters rapidly (e.g., not a cell that turns on and off frequently).

Nodes may be prioritized by predetermined categorizations. The categorizations may be predefined in a specification, predefined by a network operator, and/or the like. The nodes and/or groups of nodes may indicate to the UE which cells, frequencies, or groups belong to each category. The UE may use a predetermined set of rules to determine the category and/or group to which the UE should select/reselect. The rules may be based on time, location, configuration or broadcast information, service offered, etc. Offsets similar to those used in equations 9 and 10 and/or category specific thresholds may be used for determining the cell to which the UE should select/reselect.

The cell selection and/or reselection offsets and/or the reselection thresholds may be broadcast in a system information block (SIB) by individual eNBs in a manner similar to frequency priority. Alternatively, or in addition, offsets and/or thresholds may be broadcast by a central control eNB for multiple eNBs within a coordinated cluster. Broadcasting by the central control eNB may minimize signaling and delay for the UE to decode the broadcast information and reduce bandwidth usage. In some embodiments, the offsets and/or thresholds may be configured by the last eNB to which the UE is communicatively coupled in connected mode. The UE may use a timer to determine when the information has expired. In an embodiment, the UE may update the information from the SIB after the timer expires.

Configuration information for the UE may be provided in various ways. The configuration information may include the cell selection and/or reselection offsets, the reselection thresholds, bitmaps of applications/services supported and/or prioritized by a node, an indication of applications/services demanded by the UE, an indication of whether a node is dedicated, an indication of whether the UE is dedicated, an indication of whether a node is a priority node, an indication of a type of UE for determining priority nodes, an indication of a category and/or group to which a node belongs, an indication of a category and/or group to which the UE belongs, an indication of dedicated frequencies, and/or the like.

In an embodiment, the configuration information may be provided through an access network discovery and selection function (ANDSF). The configuration information may be included in subscription information. The UE may be preconfigured to be a dedicated UE (e.g., a MTC device with only small data) and/or preconfigured with frequencies (e.g., dedicated frequencies). The UE may receive a network indication of the configuration information (e.g., a non-access stratum (NAS) message, a radio resource control (RRC) message, and/or the like), which may be provided upon attaching to an eNB or other network node. The configuration information may be determinable based on predefined rules and/or conditions or up to the network implementation. The configuration information may be included in a SIB. In some embodiments, different elements of the configuration information may be provided in different ways.

An MME identifier (MMEI) may be configured to indicate that a corresponding MME is a dedicated node. Specific encoding of the MMEI may be used to identify the MME as a dedicated node and/or to identify which type of dedicated node the MME is. A globally unique MMEI (GUMMEI) may be constructed from a mobile country code (MCC), a mobile network code (MNC), and the MMEI. The MMEI may be constructed from a MME group ID (MMEGI) and an MME code (MMEC). In an embodiment, the most significant bits of the MMEI may be reserved to distinguish if the MME is a dedicated MME. For example, a most significant bit may be reserved to indicate if the GUMMEI is mapped from a packet temporary mobile subscriber identity (P-TMSI), a routing area identification (RAI), or the like, and the next one or more most significant bits may be reserved to indicate that the MME is a dedicated MME and/or to identify the type, category, etc. of UE supported by the MME.

Alternatively, or in addition, one or more of the most significant bits of the MMEC may be reserved to indicate whether the GUMMEI is mapped to a dedicated MME and/or to identify the type, category, etc. of UE supported by the MME. In some embodiments, the MMEI may be constructed from an MMEGI, an MMEC, and a dedicated MMEI (DMMEI). For example, the DMMEI may be 8, 16, etc. bits in length and appended after the MMEGI and MMEC. Different encodings and/or values of the DMMEI may be used to indicate the type, category, etc. of UE supported by the MME, and/or different encodings may be used for MME mode selection. For example, a predetermined DMMEI may identify MMEs dedicated to MTC traffic.

In some situations, configuration information and/or policies for selecting and/or reselecting may not exist. In such situations, the UE may use legacy calculations to determine the selection and/or reselection criteria. If multiple policies are configured, the priority of each policy may be determined according to UE implementation and/or by receiving an indication of priority from the network. The previously discussed policies may work together with existing frequency priority policies. The relative priority of the previously discussed policies and the frequency policies may be predefined by the network and/or predefined in a specification. The previously discussed policies may be higher priority than the frequency priority policies or vice versa.

FIG. 1 is a schematic diagram of a system 100 comprising a plurality of MMEs/SGWs 110, 115 and eNBs 121, 122, 125. The MMEs/SGWs 110, 115 may include an ordinary MME/SGW 110 and a dedicated MME/SGW 115. The MME and SGW functions within one MME/SGW (hereafter referred to as MME for simplicity) 110, 115 may be collocated or non-collocated, physically or logically. Similarly, the eNBs 121, 122, 125 may include ordinary eNBs 121, 122 and a dedicated eNB 125. The eNBs 121, 122, 125 may be communicatively coupled to each other via an X2 protocol. The MMEs 110, 115 may be communicatively coupled to each other via an S10/S11 protocol. The eNBs 121, 122, 125 may be communicatively coupled to the MMEs 110, 115 via an S1 protocol. The dedicated eNB 125 may be communicatively coupled to the ordinary MME 110 and/or the dedicated MME 115. Similarly, the ordinary eNBs 121, 122 may be coupled to the dedicated MME 115 and/or the ordinary MME 110.

Various UEs 150, 155 may communicatively couple to one or more of the eNBs 121, 122, 125. The UEs 150, 155 may include an ordinary UE 150 and a health UE 155 configured to use MTC. The dedicated eNB 125 and/or the dedicated MME 115 may provide support and/or priority to MTC. Accordingly, performance of the health UE 155 may be improved if it couples to the dedicated eNB 125 and/or the dedicated MME 115. The health UE 155 may adjust cell selection and/or reselection criteria to prioritize the dedicated eNB 125 and/or the dedicated MME 115 over the ordinary eNBs 121, 122 and MME 110.

Figure 2:
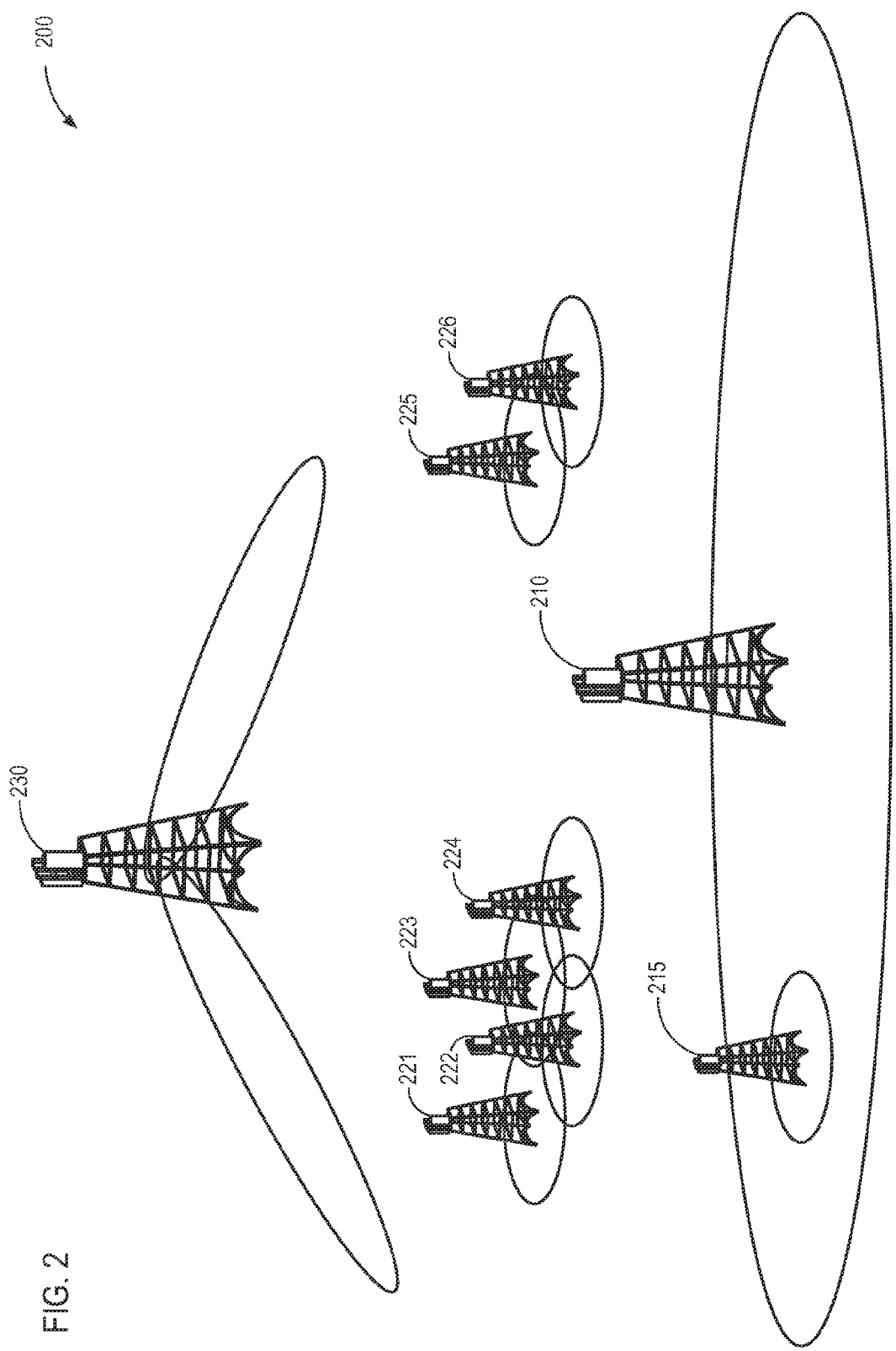
FIG. 2 is a schematic diagram of a system including a plurality of eNBs of various types.

FIG. 2 is a schematic diagram of a system 200 including a plurality of eNBs 210, 215, 221-226, 230 of various types. The plurality of eNBs 210, 215, 221-226, 230 may include different RATs and/or use different frequency layers. For example, a first set of eNBs 210, 215 may include a small cell 215 in a same frequency layer as and overlapping in coverage with a macro cell 210. A second set of eNBs 221-226 may include a plurality of small cells deployed in a cluster 221-224 and a plurality of non-clustered small cells 225, 226. A third set may include an eNB 230 with beamforming ability. The plurality of eNBs 210, 215, 221-226, 230 may support different dedicated and/or prioritized nodes.

In such a complex network deployment, it may be beneficial to allow a UE (not shown) to determine the specific eNB and/or frequency layer to use. The UE may receive an indication of a network preference and/or determine the eNB and/or frequency layer based on predetermined rules. For example, the UE may adjust priority based on whether the eNB 210, 215, 221-226, 230 is a dedicated eNB of the desired type, category, etc., based on whether the eNB 210, 215, 221-226, 230 supports a dedicated core network node (e.g., an MME, SGW, PGW, and/or the like), and/or based on whether the eNB 210, 215, 221-226, 230 is optimized for serving a specific application, application category, QCI, and/or the like with which the UE is configured. The priority may be adjusted using the offsets, thresholds, and/or the like previously discussed when performing cell selection and/or reselection.

Figure 3:
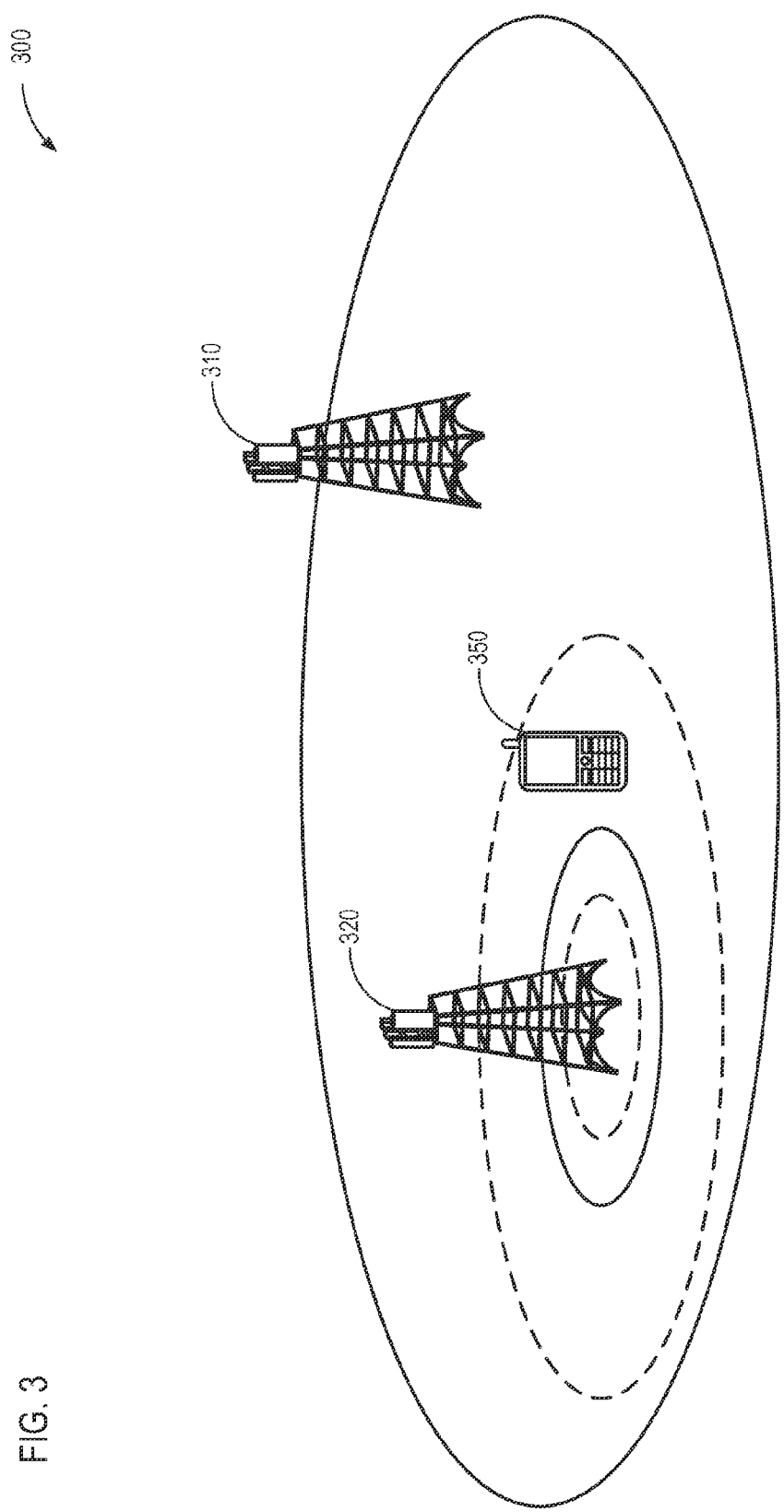
FIG. 3 is a schematic diagram of a system including a plurality of eNBs and their corresponding coverage areas.

FIG. 3 is a schematic diagram of a system 300 including a plurality of eNBs 310, 320 and their corresponding coverage areas. The plurality of eNBs 310, 320 may include a macro eNB 310 that does not support a dedicated node and a small cell eNB 320 (e.g., a micro cell, pico cell, femto cell, etc.) that does support a dedicated node or vice versa. A UE 350 may be performing cell selection and/or cell reselection to determine with which eNB 310, 320 it should communicatively couple. The UE 350 may be within the coverage area of the macro eNB 310 but outside the traditional coverage area of the small cell eNB 320, which is illustrated with solid lines. The traditional coverage area may or may not include biasing to encourage offloading from the macro eNB 310 to the small cell eNB 320.

The UE 350 may have a type, category, etc. supported and/or prioritized by the dedicated node supported by the small cell eNB 320. Accordingly, the small cell eNB 320 may be prioritized when the UE 350 is performing cell selection and/or reselection. An offset may be used to bias the cell selection and/or reselection criteria for the dedicated, small cell eNB 320 to encourage the UE 350 to communicatively couple with the small cell eNB 320. A coverage area when the bias is included is illustrated with the larger dotted circle. The UE 350 might not normally select and/or reselect the small cell eNB 320 because it is outside the coverage area. However, the UE 350 may select the small cell eNB 320 if it supports a dedicated node because the UE 350 is within the coverage area when the offset is included. An offset may also be used to bias against UEs that would not be well served or may even be harmed by a dedicated node. The small dotted circle illustrates a coverage area when an offset is included that discourages communicative coupling to the small cell eNB 320.

Figure 4:
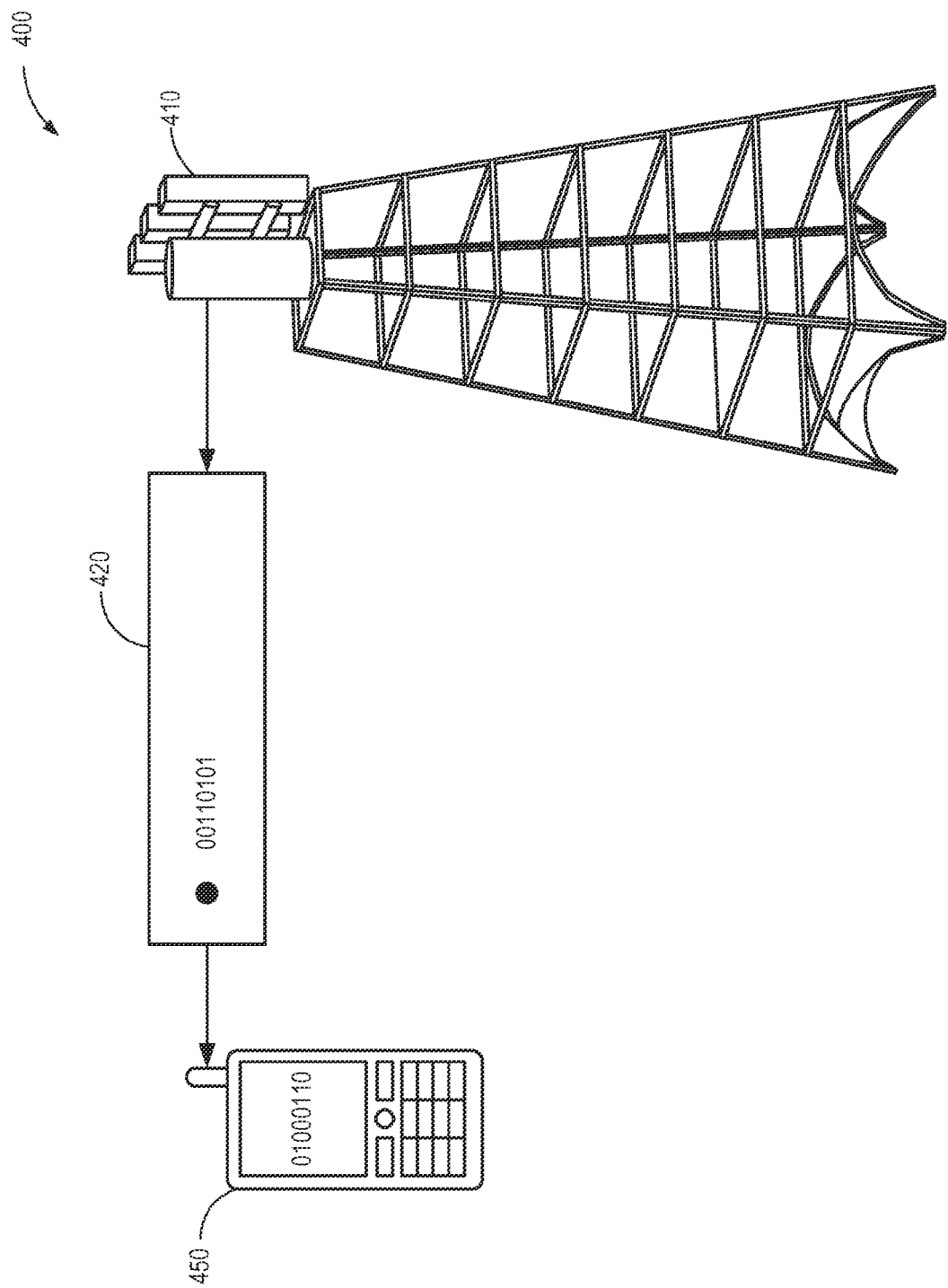
FIG. 4 is a schematic diagram of a system for communicating applications and/or services supported by a dedicated node.

FIG. 4 is a schematic diagram of a system 400 for communicating applications and/or services supported by a dedicated node. The system 400 may include an eNB 410 communicatively coupled with a UE 450. The eNB 410 may support a dedicated node. For example, the eNB 410 may be a dedicated eNB and/or may support a dedicated MME, SGW, and/or PGW. One or more applications and/or services may be supported by the dedicated node. In addition, the UE 450 may have one or more applications and/or services that it desires to have supported and/or prioritized. The eNB 410 may transmit a bitmap 420 that indicates the applications and/or services supported. The eNB 410 may determine the bitmap 420, and/or the bitmap 420 may be received by the eNB 410 from a dedicated MME, SGW, PGW, etc. and forwarded on to the UE 450.

Each bit in the bitmap may correspond to an application and/or service and the value of the bit may indicate whether that application and/or service is supported. The particular application and/or service corresponding to each bit may be predefined in a specification, predefined by a network operator, and/or the like. The UE 450 may maintain or be able to assemble its own bitmap indicating the applications and/or services that it would like to have supported and/or prioritized. The UE bitmap and the bitmap received from the eNB 410 may be compared to determine if there are any matches. For example, a logical AND operation may be performed on the bitmaps to determine which applications and/or services are supported by the eNB 410 and/or a dedicated node. If a match is found, an offset for selection and/or reselection criteria may be determined. If multiple matches are found, the offset may be cumulative, may be the largest offset of the matches, or may be determined based on a primary or most important application and/or service. The UE 450 may use the offset when performing cell selection and/or reselection.

Figure 5:
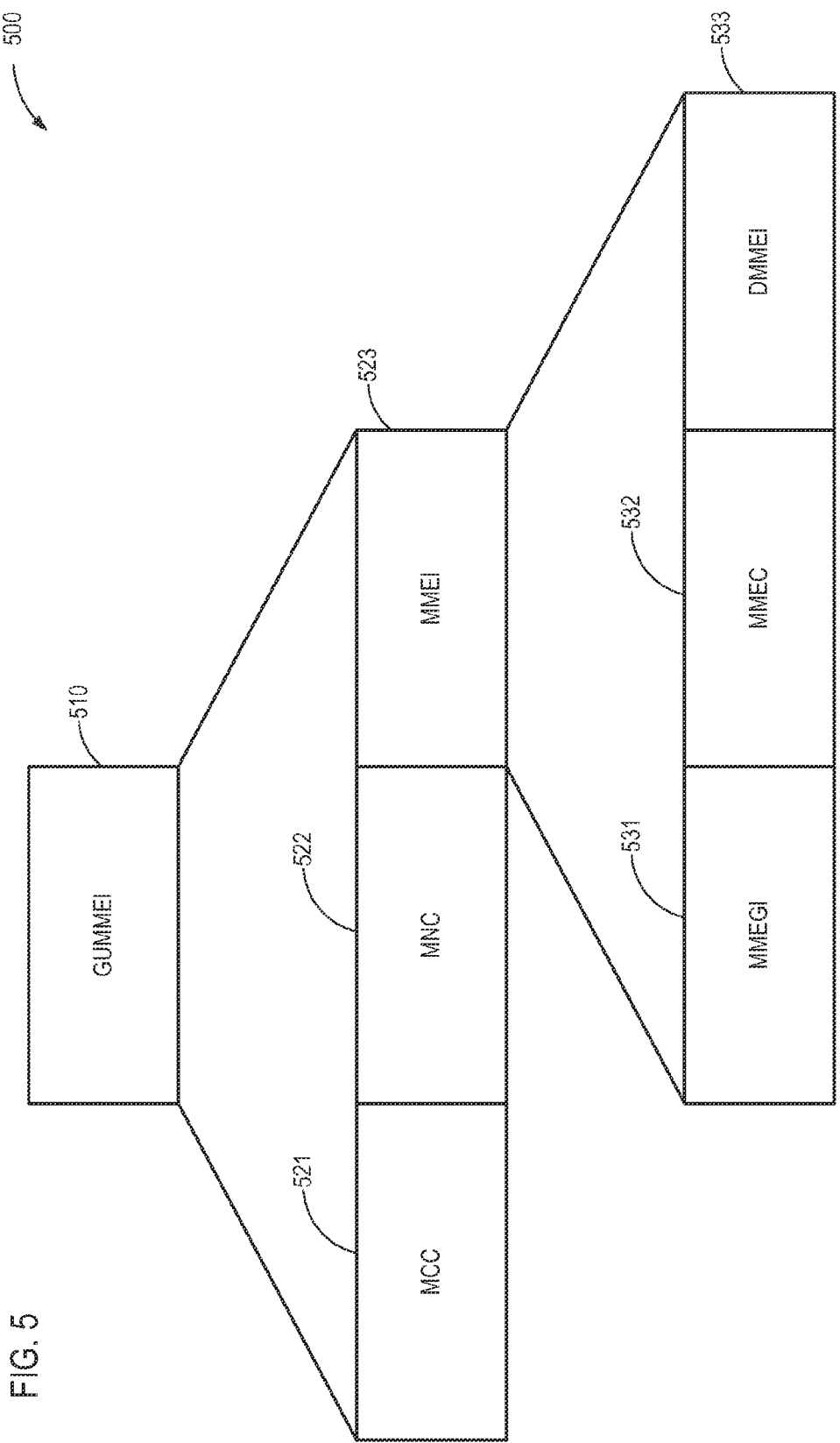
FIG. 5 is a schematic diagram of a construction of a GUMMEI according to one embodiment.

FIG. 5 is a schematic diagram 500 of a construction of a GUMMEI 510 according to one embodiment. The GUMMEI 510 may be constructed from an MCC 521, an MNC 522, and an MMEI 523. The MCC 521, the MNC 522, and the MMEI 523 may be concatenated together to create the GUMMEI 510. The MMEI 523 may be constructed from an MMEGI 531 and an MMEC 532. In the illustrated embodiment, the MMEI 523 is also constructed from a DMMEI 533. The MMEGI 531, MMEC 532, and/or the DMMEI 533 may be concatenated together to form the MMEI 523. The value of the DMMEI 533 may indicate which types and/or categories of UEs are supported and/or prioritized by the MME (e.g., each value may correspond to a particular type, category, etc. supported).

In addition to or instead of the DMMEI 533, the most significant bit(s) of the MMEGI 531 and/or the MMEC 532 may be reserved to indicate whether the MME is a dedicated MME and/or which types and/or categories of UEs are supported and/or prioritized by the MME. In some embodiments, the reserved bit(s) may indicate only whether or not the MME is a dedicated MME without indicating which particular types and/or categories of UEs are supported. Separate signaling may be used to indicate which particular types and/or categories of UEs are supported. Alternatively, different values of the reserved bits may correspond to different types and/or categories of UEs supported by the MME.

Figure 6:
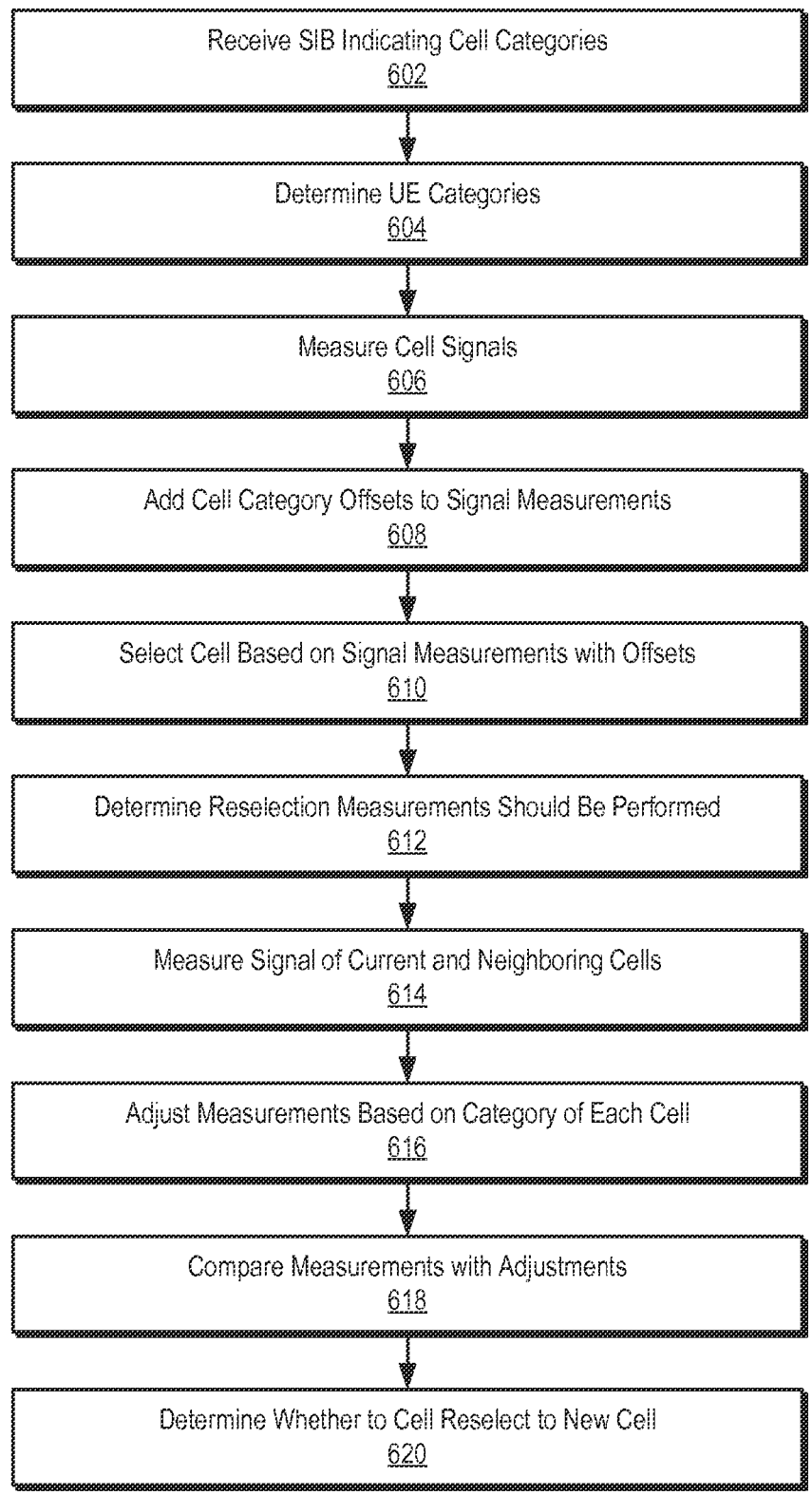
FIG. 6 is a flow diagram of a method for selecting and/or reselecting an eNB based on a category of the eNB.

FIG. 6 is a flow diagram of a method 600 for selecting and/or reselecting an eNB based on a category of the eNB (e.g., whether the eNB supports a dedicated node, a type of UE supported by the dedicated node, a category of UE supported by the dedicated node, applications/services supported by the dedicated node, whether the dedicated node is a RAN node or an EPC node, etc.). The method 600 may begin when selecting or reselecting an eNB by receiving 602 a SIB indicating one or more categories of the eNB. In some embodiments, other messaging may be used instead of or in addition to the SIB to indicate the one or more categories of the eNB. A UE category and/or type may be determined 604 and compared to the eNB category to determine whether the eNB and/or dedicated node supports and/or prioritizes the UE category. If the eNB and/or dedicated node does support and/or prioritize the UE category, a cell selection offset may be determined.

A signal from the eNB may be measured 606. For example, the RSRP and/or RSRQ of the signal may be determined based on measurements of the signal. The cell selection offset for the determined category may be added 608 to or subtracted from the signal measurements. For example, the cell selection offset for the determined category may be added or subtracted in addition to one or more additional offsets, minimum levels, compensations, etc. to calculate a cell selection criterion. An eNB may be selected 610 based on the signal measurements adjusted by the cell selection offset for the dedicated category. For example, an eNB may be selected if a cell selection criterion is greater than zero.

At some point, it may be determined 612 that reselection measurements should be performed to determine whether to reselect to a new eNB. Signals may be measured 614 for the serving eNB and/or one or more neighboring eNBs. The signal may be measured by determining an RSRP and/or RSRQ for each eNB being measured. The measurements may be adjusted 616 based on a category of each cell. For example, a category of each eNB may be received from the serving eNB and/or from each of the serving and neighboring eNBs individually. An offset for each eNB may be determined for the corresponding received category and/or may be received from the serving and/or neighboring eNBs. Each measurement may be adjusted by the corresponding offset. For example, a reselection criterion for each eNB may be computed from the measurements and the category offset in addition to one or more other offsets, if the other offsets are valid.

The adjusted measurements may be compared 618 with one another. In an embodiment, a cell selection criterion may be calculated for each eNB. Each eNB with a cell selection criterion greater than zero may be ranked based on the reselection criterion. Whether to cell reselect to a new eNB may be determined 620 based on the comparisons. For example, the UE may decide to cell reselect to an eNB having a highest ranked reselection criterion. In some embodiments, a serving eNB may not support a dedicated node, but a neighboring eNB may support a dedicated node. Thresholds may be used to determine whether to cell reselect from the serving eNB to the neighboring eNB rather than computing reselection criteria. A threshold may be determined for the neighboring eNB. The signal measurements for the neighboring eNB may be compared to the threshold to determine whether to reselect to the neighboring eNB.

Figure 7:
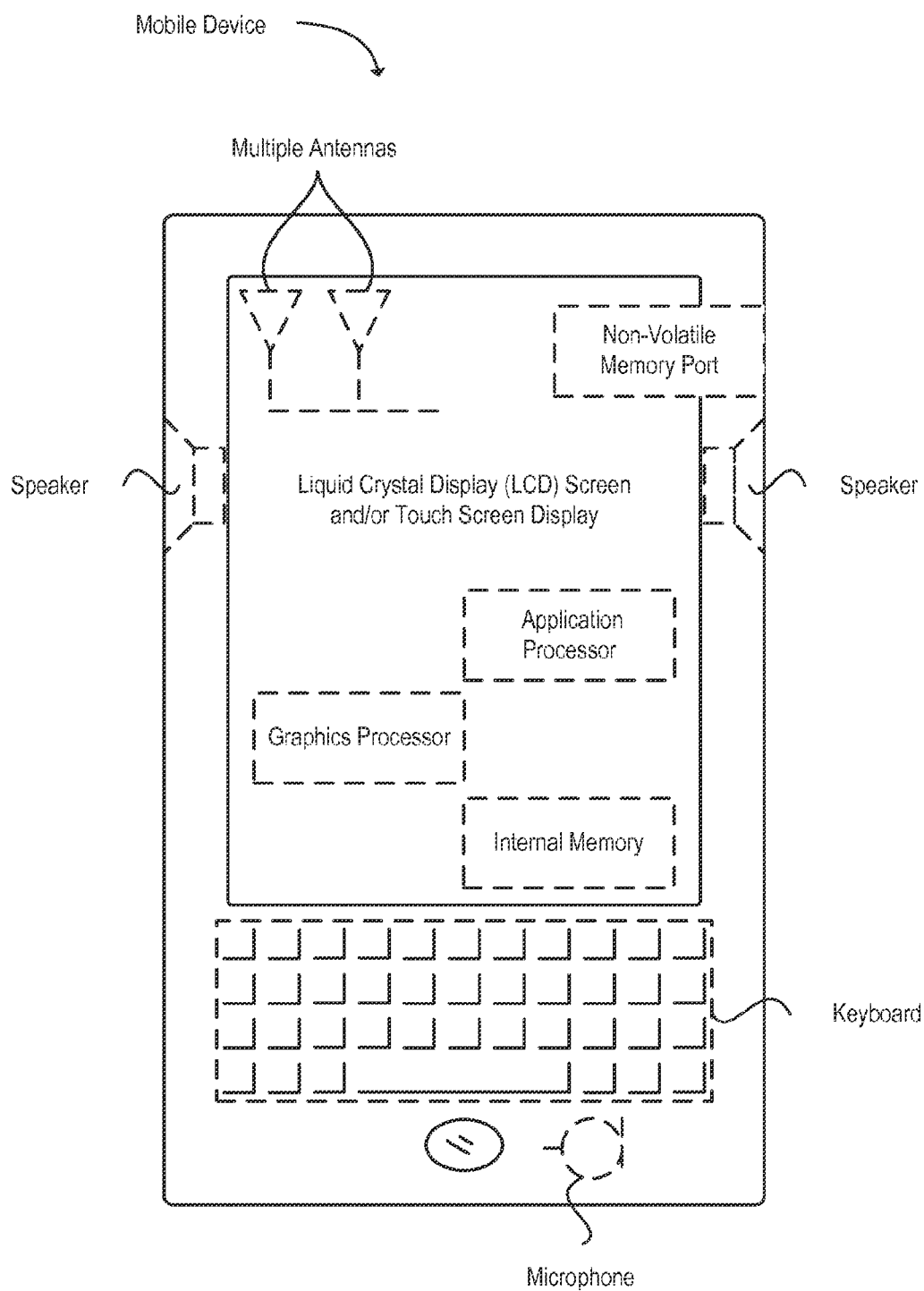
FIG. 7 is a schematic diagram of a UE able to select and/or reselect eNBs based on a priority of each eNB.

FIG. 7 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is a UE configured to communicate with an E-UTRAN. The UE includes a transceiver and a processor coupled to the transceiver. The processor is configured to measure a signal from an eNB. The processor is also configured to determine whether the eNB supports a corresponding dedicated node. The processor is also configured to compute a cell selection criterion from the signal measurement and the determination of whether the eNB supports the dedicated node.

In Example 2, the processor of Example 1 is configured to determine whether the eNB supports a dedicated node selected from the group consisting of a dedicated RAN node and a dedicated core network node.

In Example 3, the processor of any of Examples 1-2 is configured to determine whether the eNB supports a particular application/service. The processor is also configured to compute the cell selection criterion based on the determination of whether the eNB supports the particular application/service.

In Example 4, the processor of any of Examples 1-3 is configured to determine whether the eNB is associated with a predetermined category. The processor is also configured to compute the cell selection criterion based on the determination of whether the eNB is associated with the predetermined category.

In Example 5, the eNB of any of Examples 1-4 does not support a corresponding dedicated node. The processor is configured to determine whether a neighboring eNB supports a corresponding dedicated node. The processor is also configured to measure a signal from the neighboring eNB. The processor is also configured to compute a reselection criterion for the neighboring eNB. The processor is also configured to determine whether the reselection criterion exceeds a threshold.

In Example 6, the processor of Example 5 is configured to select the threshold based on whether the neighboring eNB supports the corresponding dedicated node.

In Example 7, the processor of any of Examples 1-6 is configured to determine whether the eNB supports the dedicated node by receiving a SIB from the eNB.

In Example 8, the processor of any of Examples 1-7 is configured to determine whether an MME is a dedicated MME by receiving an MME identifier indicative of whether the MME is a dedicated MME.

Example 9 is a method for selecting cells based on prioritized nodes. The method includes communicatively coupling with a base station without support for a corresponding dedicated core network. The method also includes determining, using a processor, that a neighboring base station supports a corresponding dedicated core network. The method also includes computing, using the processor, a reselection criterion for the base station based on a corresponding signal measurement. The method also includes computing, using the processor, a reselection criterion for the neighboring base station based on a corresponding signal measurement and a predetermined offset for base stations supporting corresponding dedicated core networks. The method also includes comparing, using the processor, the reselection criterion for the base station with the reselection criteria for the neighboring base station to determine whether to reselect the neighboring base station.

In Example 10, the reselection criterion for the neighboring base station of Example 9 is computed based on an offset for base stations supporting a characteristic selected from the group consisting of a particular application, a particular node type, a particular traffic type, a particular subscription, and a particular device mobility.

In Example 11, the reselection criterion for the neighboring base station of any of Examples 9-10 is computed based on an offset for base stations belonging to a predetermined categorization.

In Example 12, the method of any of Examples 9-11 also includes receiving a bitmap indicating applications supported by the neighboring base station.

In Example 13, determining that the neighboring base station supports the corresponding dedicated core network of any of Examples 9-12 includes receiving an indication that the neighboring base station supports the corresponding dedicated core network.

In Example 14, the indication of Example 13 is selected from the group consisting of an access network discovery and selection function message, a non-access stratum message, and a system information broadcast.

In Example 15, determining that the neighboring base station supports the corresponding dedicated core network of any of Examples 9-14 includes receiving a dedicated core network identifier.

In Example 16, the method of any of Examples 9-15 also includes reselecting to the neighboring base station in response to determining to reselect to the neighboring base station.

Example 17 is an apparatus including means to perform a method as described in any of Examples 9-16.

Example 18 is at least one computer-readable storage medium having stored thereon computer-readable instructions, which when executed, implement a method or realize an apparatus as describe in any of preceding example.

Example 19 is a wireless communication device including circuitry. The circuitry is configured to select an offset based on whether a base station supports a corresponding dedicated node. The circuitry is also configured to receive a signal measurement of a signal transmitted by the base station. The circuitry is also configured to calculate a selection criterion based on the offset and the signal measurement. The circuitry is also configured to determine whether to select the base station based on the selection criterion.

In Example 20, the circuitry of Example 19 is configured to select the offset based on which applications and services are provided by the base station.

In Example 21, the circuitry of any of Examples 19-20 is configured to select the offset based on whether the base station supports machine-type communication.

In Example 22, the circuitry of any of Examples 19-21 is further configured to select a reselection offset based on whether a neighboring base station supports a corresponding dedicated node. The circuitry is also configured to receive a signal measurement of a signal transmitted by the neighboring base station. The circuitry is also configured to calculate a reselection criterion based on the reselection offset and the signal measurement of the signal transmitted by the neighboring base station. The circuitry is also configured to determine whether to reselect the neighboring base station based on the reselection criterion.

In Example 23, the wireless communication device of any of Examples 19-22 is preconfigured to be a dedicated wireless communication device.

In Example 24, the circuitry of any of Examples 19-23 is configured to determine whether the base station supports the corresponding dedicated node based on one or more reserved bits in an identifier for the corresponding dedicated node.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. User equipment (UE) configured to communicate with an evolved universal terrestrial radio access network (E-UTRAN), the UE comprising:
 a transceiver; and
 a processor coupled to the transceiver, the processor configured to:
  measure a signal from an E-UTRAN Node B (eNB);
  determine whether the eNB supports a corresponding dedicated node; and
  compute a cell selection criterion from the signal measurement and the determination of whether the eNB supports the dedicated node,
 wherein when the eNB does not support a corresponding dedicated node, the processor is further configured to:
  determine whether a neighboring eNB supports a corresponding dedicated node,
  measure a signal from the neighboring eNB,
  compute a reselection criterion for the neighboring eNB, and
  determine whether the reselection criterion exceeds a threshold.

2. The UE of claim 1, wherein the processor is configured to determine whether the eNB supports a dedicated node selected from the group consisting of a dedicated radio access network (RAN) node and a dedicated core network node.

3. The UE of claim 1, wherein the processor is configured to determine whether the eNB supports a particular application/service, and compute the cell selection criterion based on the determination of whether the eNB supports the particular application/service.

4. The UE of claim 1, wherein the processor is configured to determine whether the eNB is associated with a predetermined category, and compute the cell selection criterion based on the determination of whether the eNB is associated with the predetermined category.

5. The UE of claim 1, wherein the processor is configured to select the threshold based on whether the neighboring eNB supports the corresponding dedicated node.

6. The UE of claim 1, wherein the processor is configured to determine whether the eNB supports the dedicated node by receiving a system information block (SIB) from the eNB.

7. The UE of claim 1, wherein the processor is configured to determine whether a mobility management entity (MME) is a dedicated MME by receiving an MME identifier indicative of whether the MME is a dedicated MME.

* * * * *